Aug. 14, 1951 P. B. RICHARDSON 2,564,544
WEIGHING APPARATUS
Filed June 7, 1946 8 Sheets-Sheet 1
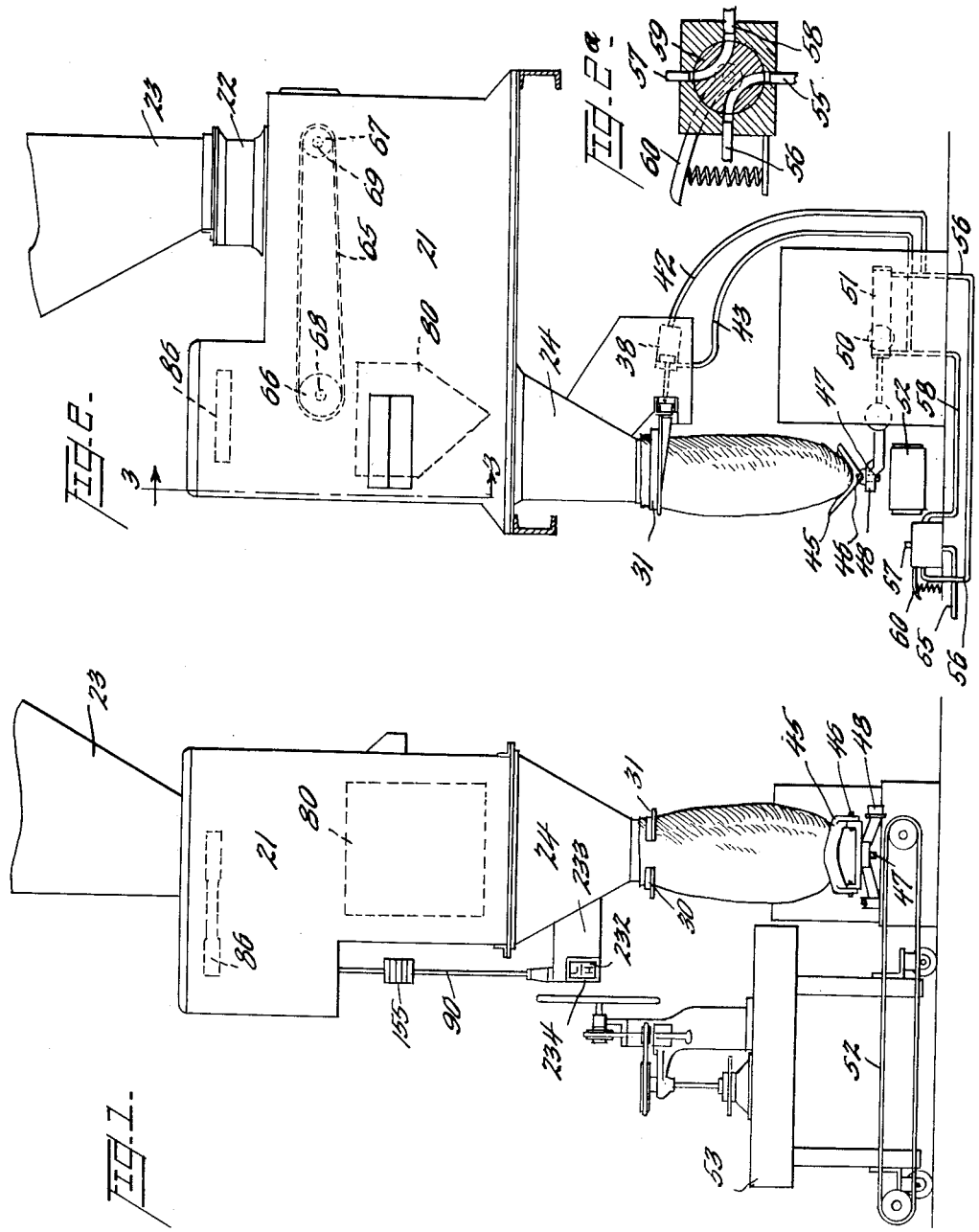
Inventor
Philip B. Richardson,
By Norman L. Bateman
Attorneys

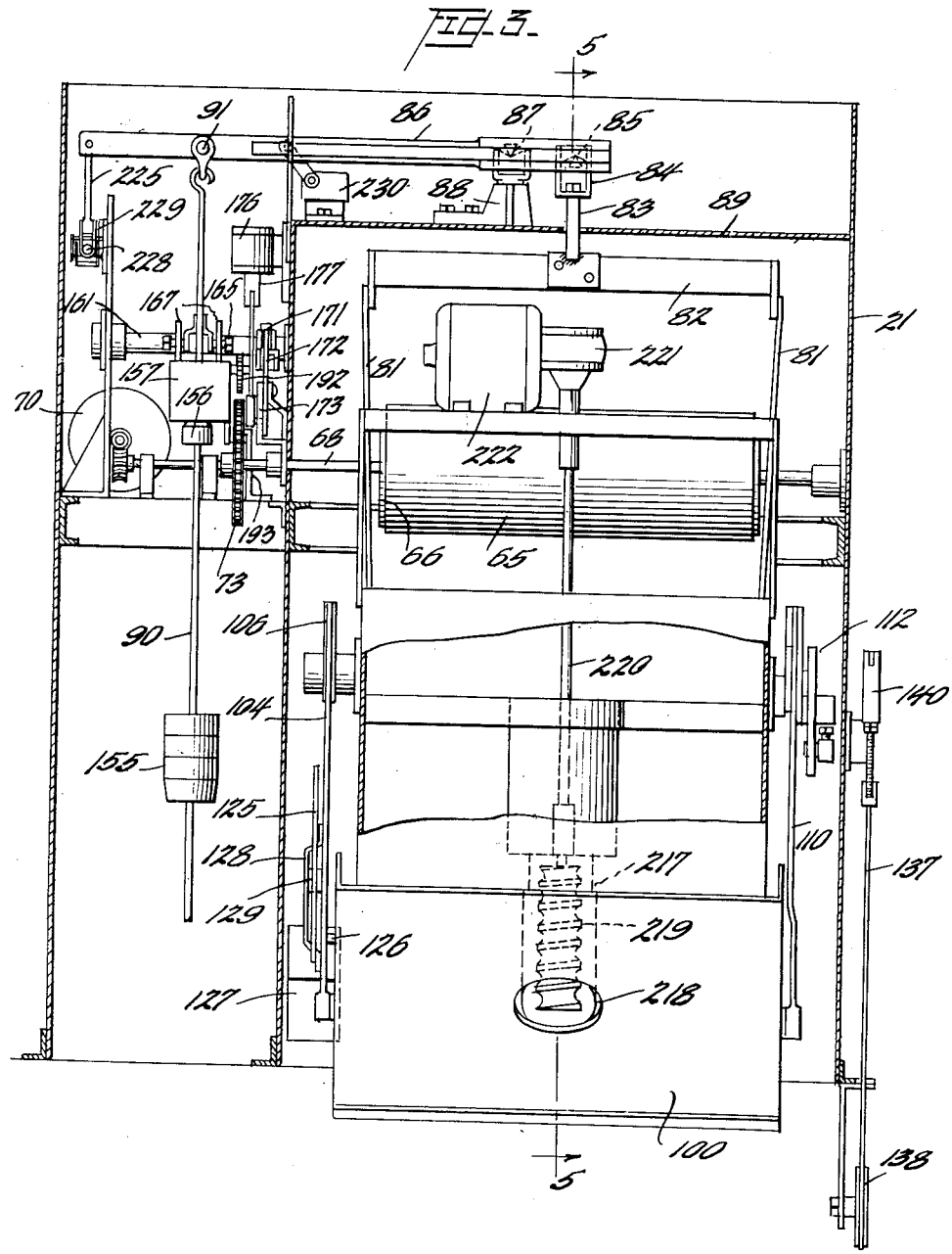

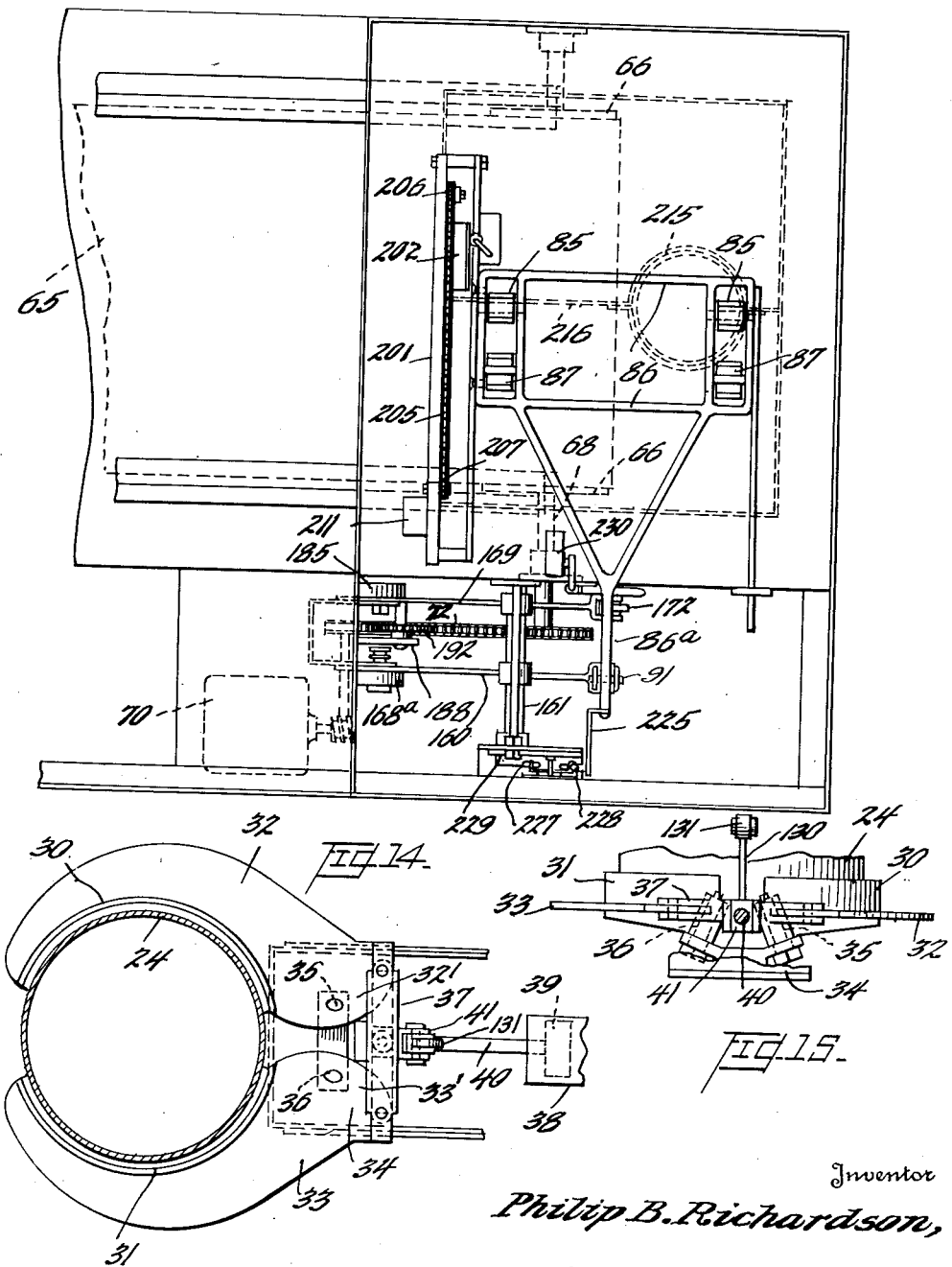

Aug. 14, 1951  P. B. RICHARDSON  2,564,544
WEIGHING APPARATUS
Filed June 7, 1946  8 Sheets-Sheet 4
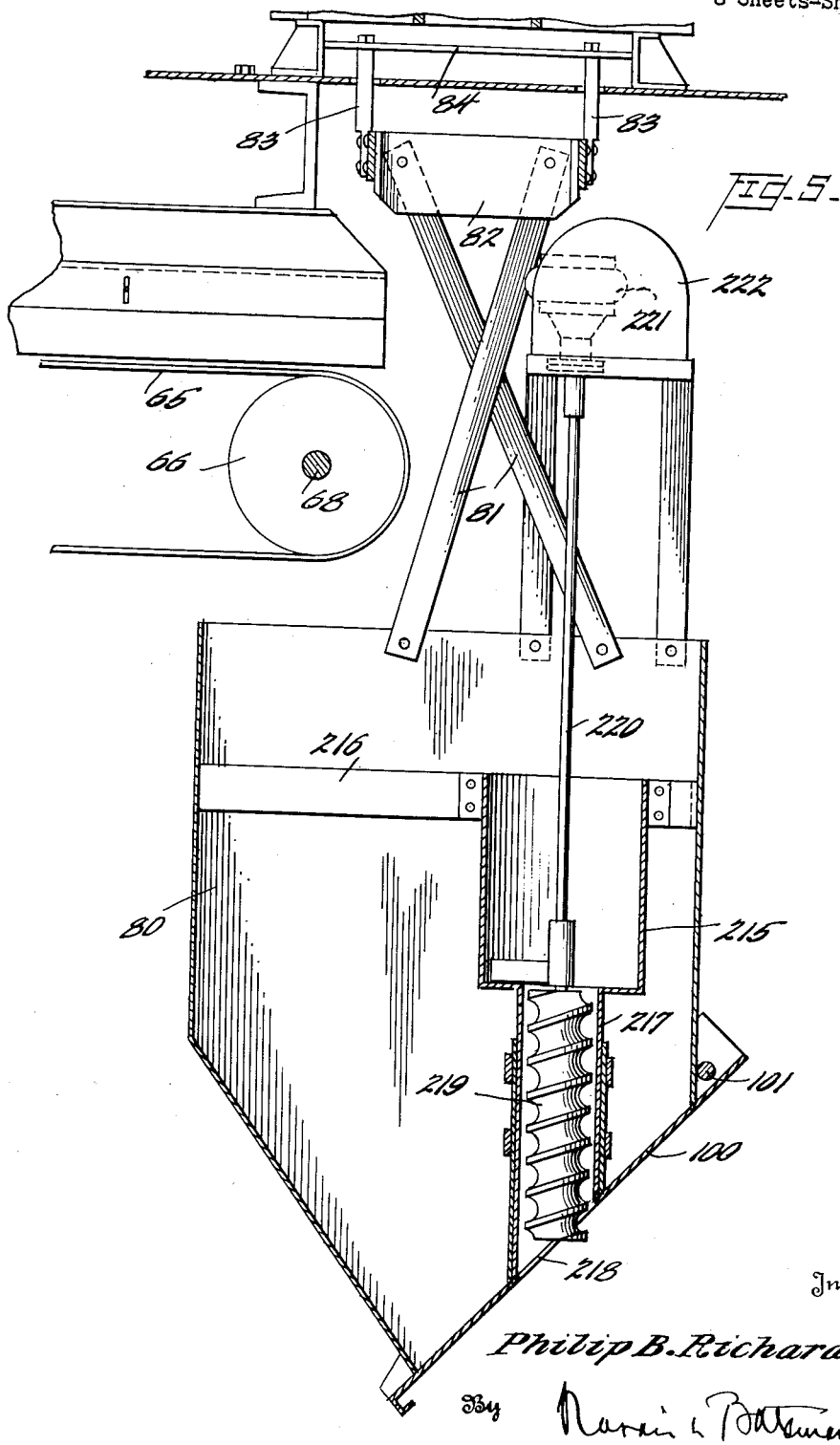
Inventor
Philip B. Richardson,
By
Attorneys Aug. 14, 1951 P. B. RICHARDSON 2,564,544
WEIGHING APPARATUS
Filed June 7, 1946 8 Sheets-Sheet 5
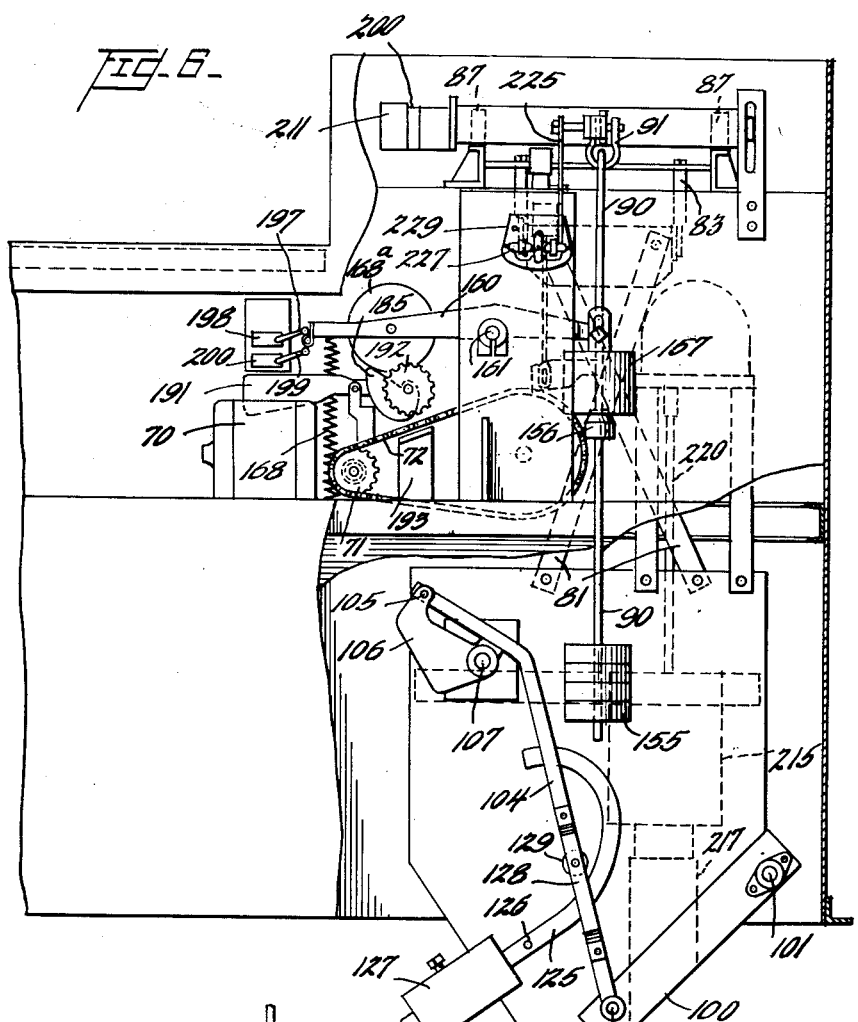
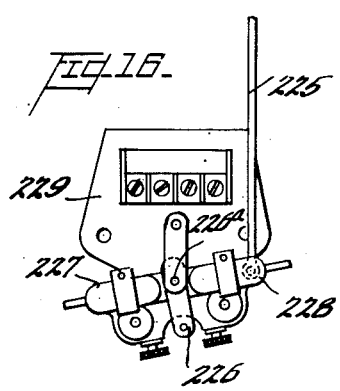
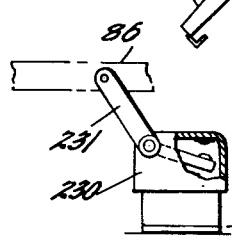
Inventor
Philip B. Richardson,
By
Attorneys Aug. 14, 1951  P. B. RICHARDSON  2,564,544
WEIGHING APPARATUS
Filed June 7, 1946  8 Sheets-Sheet 6
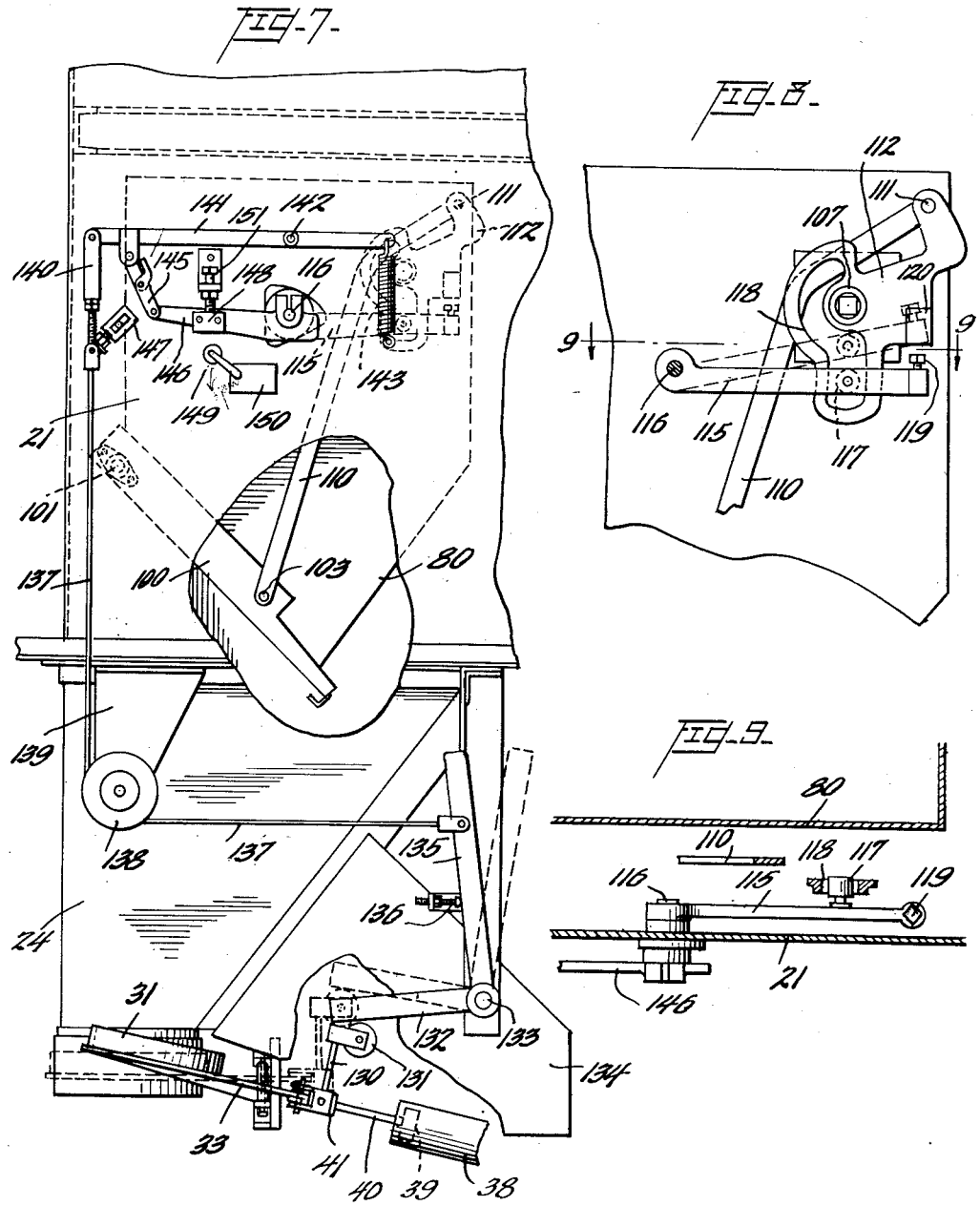
Inventor
Philip B. Richardson,
By
Attorneys

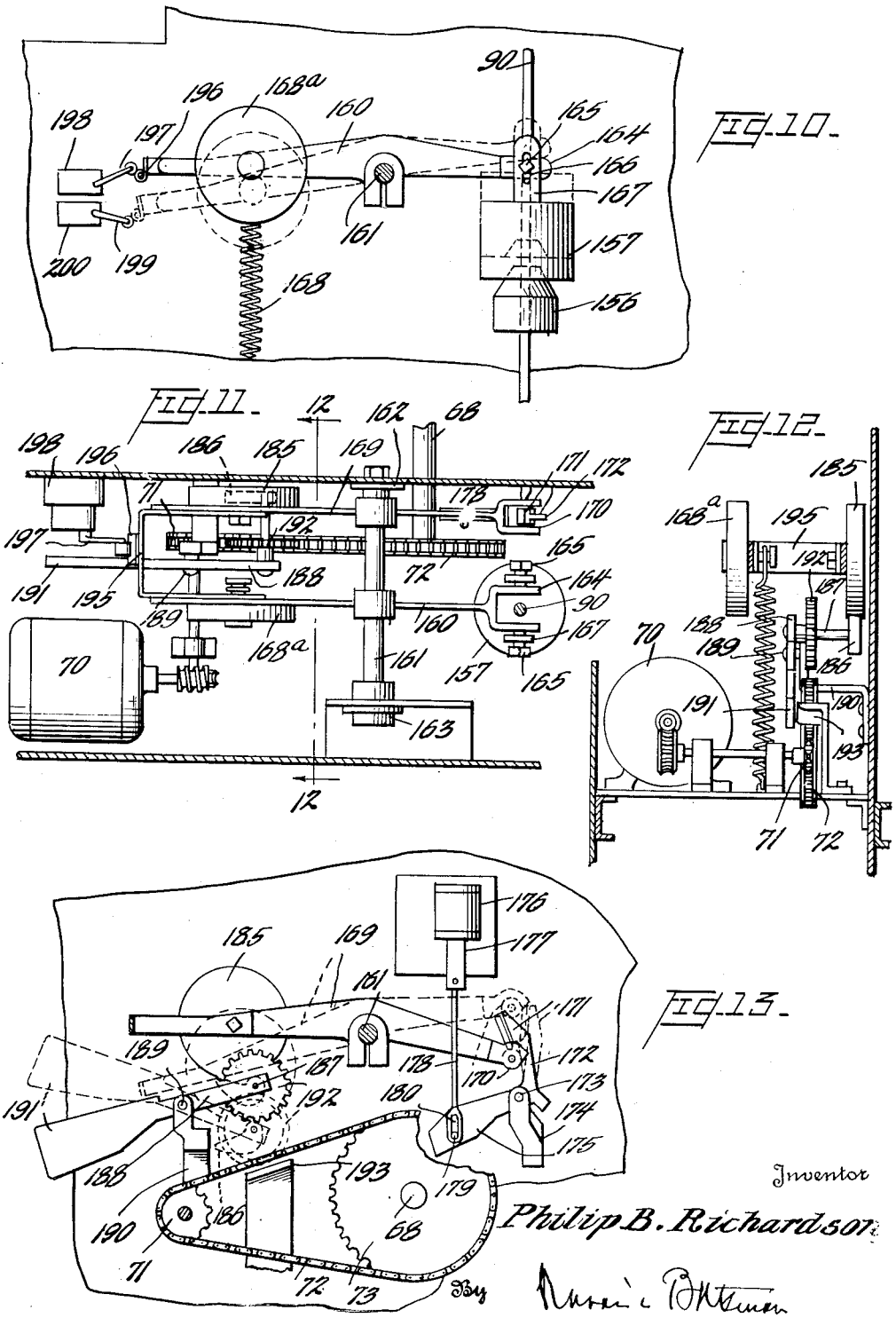

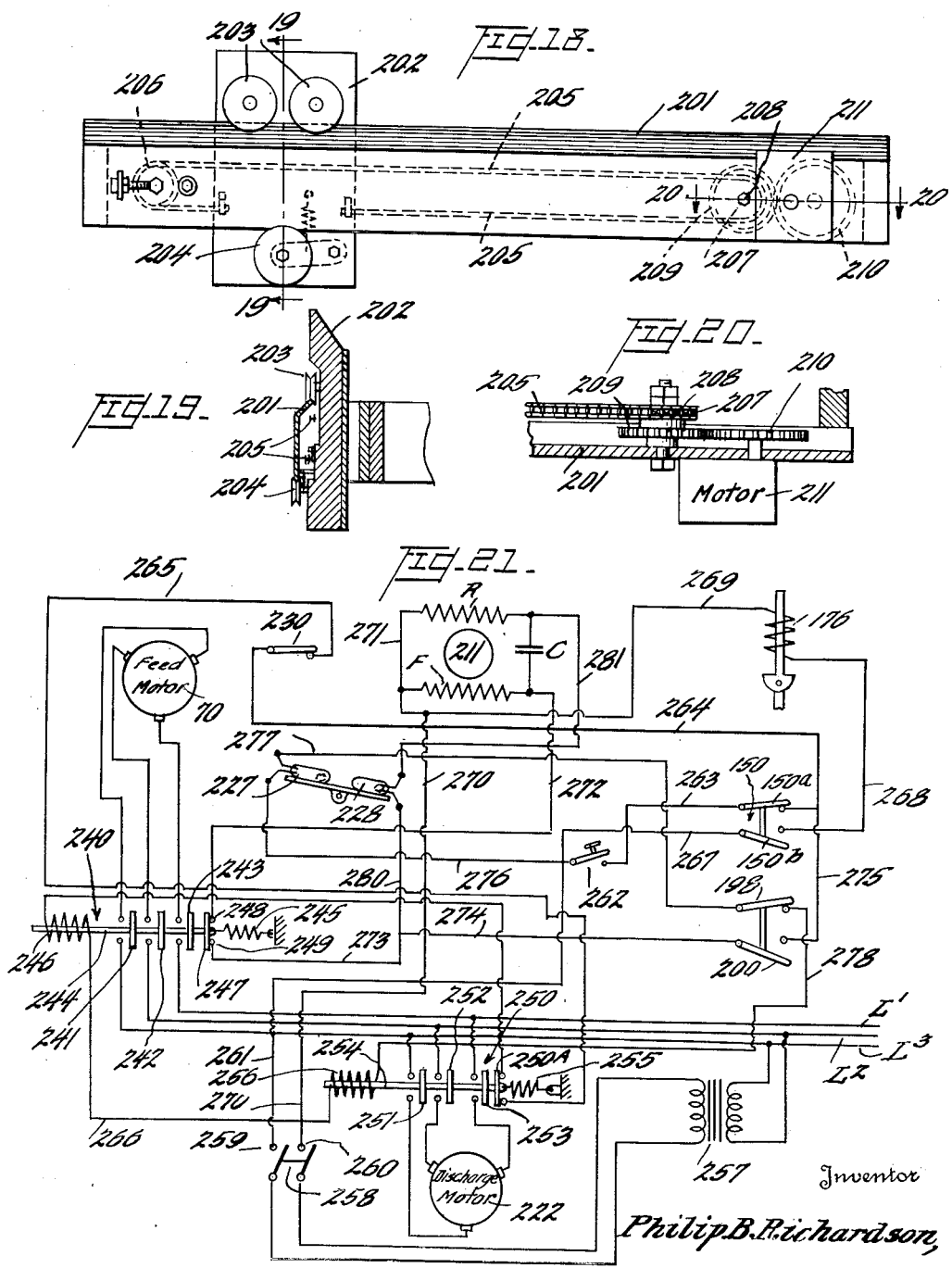

Patented Aug. 14, 1951

2,564,544

UNITED STATES PATENT OFFICE 2,564,544

WEIGHING APPARATUS

Philip B. Richardson, Montclair, N. J., assignor to Richardson Scale Company, Clifton, N. J., a corporation of New Jersey Application June 7, 1946, Serial No. 675,031

1 Claim. (Cl. 249—16)

The present invention relates to weighing machines, and more particularly to those of the automatic type in which the weighing and discharging operations are performed automatically under control of the weighing mechanism.

In the art of handling fluent materials, many of them can be fed into a weigh unit and the column of material falling at the moment of cut off can be compensated for by a simple means which cuts off the feed before all of the material to make up a weighment has been actually received by the weigh unit, the falling column of material, when received by the weigh unit making up the desired predetermined weighing. However, many materials cannot be weighed in such a simple manner. Pulverized materials such, for example, as flour, often become aerated and tend to flush while feeding, making it impossible to cut off the feed stream at the precisely correct moment to insure accuracy, with the result that the flushing material will cause an excess feed to the weigh unit, and if the entire amount of material received by the weigh unit were discharged, it would be in excess of the desired predetermined quantity. Other materials, such as pulverized materials and those of a sticky nature tend to cling to a weigh unit so that the entire quantity thereof weighed cannot be discharged readily, and when part of the weighed charge remains in the weigh unit while the charge is discharged, the discharged portion is less than the predetermined desired quantity.

The primary object of the present invention is to provide novel and improved weighing means which can be fed with material which may be in a quantity without regard to accuracy, and which may represent a predetermined quantity either with or without an excess thereof, and which can discharge exactly a predetermined quantity of the material, regardless of whether the material being weighed clings to or remains in the weigh unit during the discharging operation by maintaining a reservoir of excess material in the weigh unit at all times, and weighing out only a predetermined amount of the material during or as part of each discharging operation.

Another object of the invention is to provide a novel structure and arrangement for accomplishing the foregoing which can be used with the various known types of weighing machines or scales.

To these and other ends, the invention consists in certain improvements and combinations and arrangement of parts, all as will be hereinafter more fully described, the features of novelty being pointed out more particularly in the claim at the end of this specification.

In the accompanying drawings:

Figure 1 is a front elevation of a weighing machine embodying the present invention.

Figure 2 is a side elevation of the weighing machine shown in Fig. 1 as viewed from the right thereof.

Figure 2a is a detail section of the control valve.

Figure 3 is an enlarged vertical section on the line 3—3 in Fig. 2.

Figure 4 is a top plan of the structure shown in Fig. 3.

Figure 5 is an enlarged vertical section on the line 5—5 in Fig. 3.

Figure 6 is an elevation, with parts broken away, of the structure shown in Fig. 3 as viewed from the left.

Figure 7 is an elevation of the structure shown in Fig. 3 as viewed from the right, and including in addition, a bag holder.

Figure 8 is a detail view, on an enlarged scale, of part of the hopper door toggle and the means for releasing it.

Figure 9 is a detail section on the line 9—9 in Fig. 8.

Figure 10 is a detail view in elevation of part of the means for lifting the weigh weight from the scale beam.

Figure 11 is a top plan of Fig. 10.

Figure 12 is a section on the line 12—12 of Fig. 11, looking toward the left.

Figure 13 is a detail elevation of the means for actuating the weigh weight lifting means.

Figures 14 and 15 are detail views in top plan and elevation respectively, of the bag holder.

Figures 16 and 17 are detail views of the weigh beam controlled switches.

Figure 18 is a detail view in elevation of the travelling poise.

Figure 19 is a detail section on the line 19—19 in Fig. 18.

Figure 20 is a top plan view of one end of the beam for the travelling poise.

Figure 21 is an electrical diagram, showing the operating and controlling circuits.

Similar parts are designated by the same reference characters in the several views.

The preferred embodiment of the invention is shown in the present invention applied to a weighing machine having a travelling belt for feeding the material to a weigh unit in the form of a hopper, and in which the weighments are discharged mainly by opening a hopper discharge door and the remainder of the weighments are discharged by an auger, but it is to be understood that the invention is not limited in its use to a weighing machine of that type but that the weigh unit may be of other types, and other means may be employed for feeding the material to the weigh unit and for discharging the material therefrom.

As shown in the present instance, the weighing machine to which the invention is shown applied comprises an outer casing 21 having a chute 22 connected to the lower end of a bin 23 to receive therefrom the material to be weighed, and the lower end of the casing is provided with a filling spout 24 to receive the weighed material as it is discharged. In applying the invention to the bagging of material, as shown in the present instance, the lower end of the spout 24 is adapted to enter the mouth of a bag which may be placed manually thereover, and is provided with a suitable holder for securing the bag in filling position on the spout.

Bag holders of different kinds may be used, but it is preferable to employ a bag holder substantially as shown in Figs. 14 and 15, comprising a pair of segmental grippers 30 and 31 adapted to clamp a bag mouth against opposite sides of the filling spout, these grippers being carried by arms 32 and 33 which are pivotally mounted on a relatively fixed support 34 by a pair of pivot pins 35 and 36 the axes of which diverge upwardly so that they will swing away from the spout in an outwardly and upwardly inclined path, thus providing ample space beneath them for the operator's hands in placing the bags on the spout, and the grippers will swing inwardly and downwardly toward the spout to clamp the bag mouth and thereby support the bag in filling position. The arms are actuated to swing the grippers toward and from the spout by extensions 32' and 33' of the arms, and a toggle 37 connecting these extensions, straightening of the toggle forcing the grippers inwardly into bag clamping position and flexing of the toggle retracting the grippers to release a filled bag and to permit an empty bag to be placed on the spout. The toggle is preferably straightened and flexed by pneumatic means such as a cylinder 38 having a piston 39 reciprocable therein and having its rod 40 connected to the middle of the toggle by a clevis 41. The piston 39 is operated by compressed air admitted to one or the other end of the cylinder through pipes 42 and 43.

A packer is preferably employed for settling the material in the bags, a packer substantially as disclosed in my prior Patent No. 2,376,810 granted May 22, 1945, being shown in the present instance for this purpose, and to which patent reference is made for a detailed disclosure thereof. For the purposes of the present invention, it is deemed sufficient to describe the packer briefly as comprising a cradle 45 which is mounted to rock on a horizontal pivot 46 and to swing on a vertical pivot 47 on a carriage 48, the latter being mounted to reciprocate horizontally to bring the cradle beneath a bag suspended on the filling spout and having means for rocking the cradle to facilitate its entry beneath the empty bag and its withdrawal from beneath a filled bag, and also having means for swinging the cradle about its vertical pivot 47 to settle the material in a bag resting on the cradle. The carriage is preferably reciprocated by a piston 50 operating in a cylinder 51, as in my prior patent aforesaid.

In order to coordinate the operations of the packer and bag holder, the pipe 42 connected to the cylinder 38 for admitting compressed air thereto to close the bag holder is connected to the end of the cylinder 51 to which compressed air is admitted to extend the packer into a position beneath the filling spout to cooperate with a bag on the filling spout, and the pipe 43 connected to the end of the cylinder 38 for admitting compressed air thereto to open the bag holder and thus release a filled bag from the filling spout is connected to the end of the cylinder 51 to which compressed air is admitted to retract the packer from beneath a filled bag suspended from the filling spout. Accordingly, the packer will be withdrawn from beneath a filled bag and the filled bag will be released from the filling spout substantially concurrently, thereby permitting the filled bag to drop from the filling spout, preferably onto a travelling belt 52, and the latter may convey the filled bag, while standing upright thereon, to a sewing machine 53 of any suitable or well known type for sewing and thus closing the mouth of the filled bag. Any suitable valve may be employed for controlling the supply and exhaust of compressed air to and from the cylinders 38 and 51, the valve shown conventionally in the present instance being substantially like that disclosed in my aforesaid prior patent, it having a compressed air inlet 55 and a pipe 56 leading from the valve to the ends of the cylinders 38 and 51 to which compressed air is supplied to close the bag holder and extend or advance the packer respectively, and having an outlet 57 and a pipe 58 leading to the valve from the ends of the cylinders from which air is exhausted during the closing of the bag holder and the advance of the packer, the valve having a rotatable valve member 59 which is preferably actuated by a pedal 60 and is provided with ports whereby depressing of the pedal will reverse the compressed air inlet and exhaust relatively to the pipes 56 and 58 and thereby cause opening of the bag holder and retraction of the packer.

Material supplied to the casing 21 which contains the weigh unit is received by a feeder which may be of any suitable type, it being shown in the present instance as of the endless travelling belt type 65 which is disposed horizontally, or substantially so, and passes around head and tail pulleys 66 and 67 respectively, these pulleys being mounted on shafts 68 and 69 suitably journaled within the casing, the tail pulley 67 being located substantially beneath the chute 22 through which the material is supplied to the upper stretch of the tail end of the belt, and the latter travelling in a direction to convey the material on its upper stretch to the head end of the belt. The belt is driven from the reduction gear head of an electric motor 70 through a sprocket 71 on its shaft which drives a chain 72, the latter passing around a sprocket wheel 73 which is fixed to the head pulley shaft 68. The motor 70 operates periodically, under the control of means hereinafter described, to advance the belt intermittently to supply the charges to be weighed to the weigh unit.

The weigh unit may be of different types, that shown comprising a hopper 80 suspended by bars 81 from a cross member 82, and the latter is suspended by bolts 83 from a cross-bar 84, and this bar is suspended from knife-edges 85 in one end of a weigh beam 86. As shown in Fig. 4, the weigh beam comprises a rectangular portion which carries the knife-edges 85 and also knife-edges 87 the bearings of which are supported in fixed position by brackets 88 mounted on a transverse member 89 which is suitably supported in fixed position in the upper portion of the casing 21. The weigh beam is fulcrumed by the knife-edges 87, and the portion of the beam at the side of these knife-edges opposite to the knife-edges 85 suspending the weigh hopper is formed as a narrowed extension 86a of suitable length to provide the desired leverage, and has a rod 90 suspended therefrom by a knife-edge 91, this rod carrying the weights to counterbalance the weigh hopper and material therein in a manner hereinafter described. The bottom of the hopper has an opening which is provided with a discharge door 100 for the gravity discharge of weighed material, this door being provided with any suitable or well known means for locking it in closed position during the weighing operation and for unlocking it to permit it to open and discharge material, the door being shown in the present instance as pivoted at its upper end to the opposite sides of the hopper by a shaft 101 and pivotally connected toward its lower end, and at its opposite sides, as at 102 and 103 respectively, to a pair of toggles, one of which comprises a link 104 connected at its lower end to the pivot 102 and pivotally connected at its upper end, at 105, to a cooperating toggle link 106, the latter being fixed to a shaft 107 which extends across and is journaled in the opposite sides of the hopper. The centers of the pivots 102, 105 and 107 are so located that while the hopper door is closed, these pivots will be slightly past a dead center, as shown in Fig. 6, whereby the hopper door will be locked in closed position; and when the upper ends of the links 104 and 106 are swung toward the right in said figure, the toggle will be broken and the door will be free to swing open under the weight of material in the hopper. A similar toggle is provided at the opposite side of the hopper to operate in unison with the toggle just described, this other toggle, as shown in Fig. 7, comprising a link 110 the lower end of which is connected to the pivot 103 on that side of the hopper door, and the upper end of which is pivotally connected at 111 to a cooperating toggle member 112, the latter being fixed to transverse shaft 107, the centers of the pivots 103, 107 and 111 being slightly past dead center while the hopper door is closed, and being unlocked to permit opening of the door by swing of the upper ends of the links 110 and 112 toward the left in Figs. 7 and 8. Normally, the toggle link 112, and also the toggle link 106 connected thereto by the shaft 107, are held against premature unlocking movement by a lever 115 which is fixed to a shaft 116 suitably journaled in the adjacent side of the outer casing 21 and carries a roller 117 to operate in a cam slot 118 in the link 112, this cam slot having an approximately radial lower portion in which the roller rests while the toggle is locked and the lever 115 is in its lower position, thus preventing unlocking of the toggle, and having a substantially concentric upper portion in which the roller 117 may ride after the lever 115 has been lifted, thus permitting the link 112 to swing to unlock the toggle. The link 112 is swung to unlock the toggle by pressing of a screw or other projection 119 on the lever 115 against an abutment 120 on said link when said lever is swung upwardly, thereby swinging the pivot 111 over the dead center and unlocking the respective toggle, and as the link 106 of the toggle on the other side of the hopper is connected to the toggle link 112, the lever 115 controls the locking and releasing of both toggles. After the hopper door has been opened and discharged material from the hopper and the door thus relieved of the weight of material thereon, it is closed automatically by suitable counterbalancing means which comprises, in the present instance, a lever 125 pivoted at 126 to a side of the hopper and having a counterweight 127 adjustably fixed thereon. The upper portion of this lever extends through a space provided between the link 104 and a guide strip 128 fixed to a side thereof and in a position to cooperate at its upper edge with a roller 129 carried by the link 104. The upper roller-engaging portion of the lever 125 is curved upwardly so that while the toggle link 104 swings into unlocked position or toward the right in Fig. 6, the roller 129 will ride on this curved portion and rock the lever in a direction to lift its counterweight, and the latter will be held in raised position under the weight of the discharging material on the hopper door, but after the material has been discharged from the hopper and the hopper door is relieved of the weight of such material, the weight of the counterbalance 127 is sufficient to swing the hopper door to closed position and to restore its controlling toggles to locked condition, thus preparing the hopper for the next charge of material to be supplied thereto from the feeder.

The unlocking or tripping of the hopper door toggle is preferably controlled automatically from the bag holder whereby the hopper door will be unlocked and will open to discharge material from the weigh hopper concurrently with the closing of the bag holder to secure a bag on the filling spout. In the present instance such control means comprises a post 130 which is fixed rigidly to the clevis 41 connecting the inner ends of the toggle members 37 and carrying a roller 131 which is engageable with the under side of a lever 132, the latter being fixed to a shaft 133 suitably journaled in a relatively fixed support 134 attached to the filling spout 24, this shaft having an arm 135 fixed thereon and which rests against a stop 136 while the bag holder is open and the hopper door locked. A cable 137 is attached to the arm 135 and passes around a guide sheave 138 supported at a side of the filling chute by a bracket 139, and the cable extends upwardly and is connected by a yoke 140 to one end of a lever 141, this lever being pivoted at 142 to the adjacent outer side of the casing 21, and attached at its other end to a tension spring 143, which acts to return this lever to and to retain it in its normal position. Due to the mounting of the bag holder arms 32 and 33 on pivots 35 and 36 which are oppositely inclined so that they diverge upwardly, the toggle 37 connecting these arms will move upwardly while the arms 32 and 33 swing inwardly to clamp a bag and such upward movement of this toggle carries the roller 131 upwardly from the full line to the dotted line position as indicated in Fig. 7. Such upward movement of this roller causes it to engage and swing the lever 132 upwardly, thereby swinging the arm 132 from the full line to the dotted line position indicated in said figure, thereby pulling the cable 137 downwardly. Such movement of the cable tilts the lever 141 downwardly and, through a toggle 145 which is normally straightened or locked, tilts downwardly a lever 146 which is clamped or otherwise fixed to the shaft 116 at the exterior of the casing 21, thereby swinging the lever 115 upwardly and thus unlocking the hopper door toggles. As the toggle 145 approaches the limit of its descent, it engages an abutment 147 fixed in a suitable position on the exterior of the outer casing 21, which flexes or breaks this toggle, thus permitting the lever 141 and cable 137 to continue their movements without interference by the lever 115. The descent of the lever 146 brings an abutment 148 carried thereby into engagement before the breaking of the toggle with an actuating arm 149 of a limit switch 150 comprising switch members 150a and 150b and to operate said switch as will be hereinafter described. While the lever 146 is in its normal raised position, the abutment 148 thereon rests against a stop 151 fixed to the exterior of the outer casing 21.

According to the present invention, the hopper or weigh unit is fed with a quantity of material without regard to accuracy and which may represent a predetermined desired quantity either with or without an excess thereof, the total amount of material in the hopper or weight unit is balanced, the major portion of the desired quantity is discharged immediately upon completion of each weighing operation, and the remainder of the desired quantity is discharged under control of the weighing mechanism until the total amount discharged equals the desired quantity. In applying the invention to a weighing machine of the type hereinbefore described, the counterbalance rod 90 carries a tare weight 155 which is adjusted to balance the weigh hopper, the mechanism carried by it, and a reservoir of material in the hopper over and above the desired weighment. The counterbalance rod 90 also has a collar 156 fixed thereon and on which a weigh weight 157 is arranged to rest, this weight being movable vertically on the rod 90 so that it may be lifted from the collar 156 to remove its counterbalancing influence on the scale beam 86.

The weigh weight 157 is lifted above the collar 156 at the end of each feeding operation by a lever 160 which is clamped or otherwise fixed to a shaft 161 journaled in bearings 162 and 163 suitably supported in the casing 21, the lever 160 having a fork 164 at one end which straddles the rod 90 and carries screws or pins 165 which operate in vertical slot 166 formed in lugs 167 fixed to the top of the weight 157. The other end of the lever 160 has a spring 168 attached thereto and to a fixed part of the casing and acts to lift the weigh weight from the collar 156. A second lever 169 is clamped or otherwise fixed to the shaft 161 and connected at one end to the lever 160 to rock in unison therewith, this second lever being provided at its end corresponding to the fork 164 with a roller 170 which, when the lever 169 is rocked into the full line position shown in Fig. 13, engages beneath the dog 171 on a trigger 172, thus holding this end of this lever in lowered position. The trigger is pivoted at 173 on a bracket 174 suitably supported in fixed position in the casing, and has a weighted arm 175 thereon which acts to swing the trigger to bring the dog 172 thereon above the roller 170. The trigger is retracted to release the roller 170 by a solenoid 176 which is suitably fixed within the casing, the solenoid having an armature 177 which is connected by a rod 178 to a pin 179 on the weighted arm 175, a slot 180 being provided in the rod to receive the pin and thus permit latching of the dog 171 over the roller 170 freely of the solenoid. Energizing of the solenoid, however, while the trigger is in holding engagement with the roller 170, as shown by the full lines in Fig. 13, will rock the trigger into the dotted line position shown in this figure, and thereby retract the dog 171 from above the roller 170 and permit this lever to rock into the dotted line position shown in Fig. 13 under the action of the spring 168. As the lever 160 is connected to the lever 169 through the shaft 161, such rocking movement of the lever 169 will lift the end of the lever 160 carrying the fork 164, thereby lifting the weigh weight from the collar 156 and thus removing the influence of the weigh weight from the weigh beam.

The weigh weight is lowered against the action of the spring 168 to bring it to rest on the collar 156 by a roller 185 which is mounted rotatably on the lever 169 toward the end thereof opposite to that which carries the roller 170, and the roller 185 rests on a cam 186 fixed to one end of a shaft 187 when the lever 169 is released by the trigger. The shaft 187 carrying said cam is mounted rotatably in one end of a lever 188 which is pivoted at 189 on a bracket 190 suitably supported in fixed position in the casing, the other end of this lever being provided with a counterweight 191 which acts to lift the shaft 187 carrying the cam at one end and also carrying at its other end a sprocket 192 which is fixed to said shaft and when lowered engages the feed belt driving chain 72 and to be driven thereby, a stationary support 193 being provided beneath the chain to insure proper driving engagement between it and the sprocket 192. Accordingly, when the trigger 172 trips the lever 169 upon energizing of the solenoid 176, the roller 185 drops onto the cam 186, overbalancing the counterweight 191 and carrying the sprocket 192 down into engagement with the feeder chain 72 to be driven thereby, and the rotation thus imparted to the sprocket rotates the cam 186 connected thereto, and the cam on which the roller 185 rides lifts this roller and the corresponding ends of the levers 160 and 169, causing the lever 160 to lower the weigh weight onto the collar 156, and lowering the roller 170 on the lever 169 until it is latched beneath and held by the dog 171 of the trigger. To insure proper centering of the weigh weight 157 on the collar 156, these elements are provided with complemental conical surfaces, as shown. A cross member 195 is preferably secured to and connects the levers 160 and 169, and this cross member carries a lug 196 which is engageable with an operating arm 197 of a normally open interlock switch 198 to allow this switch to close when said levers are rocked in a direction to lower the weigh weight and to hold the lever 160 in position by engagement of the trigger, and is engageable with an operating arm 199 of a normally closed interlock switch 200 to open this switch when said levers are rocked in the opposite direction, as will be apparent from the full and dotted lines in Fig. 10, the switch 198 being opened and the switch 200 allowed to close when said levers are rocked in the opposite direction to lower the weigh weight onto the collar 156.

The weigh beam 86 has an auxiliary beam 201 bolted or otherwise fixed thereto to extend longitudinally thereof and to move therewith, and this auxiliary beam is provided with a travelling poise 202. The travelling poise arrangement may be similar in its construction to that shown and described in my co-pending application Ser. No. 534,933, filed May 10, 1944, now Patent No. 2,434,177, to which reference may be made for the details of its construction, it being deemed sufficient for the purposes of the present invention to illustrate and describe the construction of the travelling poise only in a general way. The travelling poise, however, cooperates in a novel manner with the other elements of the weighing machine, as will be hereinafter described. Briefly described, the travelling poise 202 is guided to travel along the auxiliary beam 201 by rollers 203 which ride on the top of the beam and a roller 204 which is engageable with the lower edge of the beam to steady and prevent tilting or displacement of the poise. The poise is advanced and retracted along the beam by a chain 205 which passes around a pair of sprockets 206 and 207 and is attached at its ends to the poise. The sprocket 207, which drives the chain, is fixed to a gear 209, and said sprocket and gear are mounted rotatably on a fixed shaft 208, said gear meshing with a gear 210 driven by a reversible electric motor 211. Operation of this motor in one direction drives the chain 205 to move the poise along the auxiliary beam from a zero position to add to the counterbalance of the main beam 86, and operation of this motor in a reverse direction causes the poise to travel in the opposite direction and to return to its zero position. This motor may be of any well known type in which forward and reverse operation thereof are obtained by energizing forward and reverse coils respectively.

The major portion of the material fed from the head pulley end of the feed belt 65 is received by the main part of the weigh hopper, but a portion of such material enters and fills a compartment 215 (Fig. 5) which is supported in fixed position within the hopper as by bolting it to a cross-member 216 secured within the hopper. A feed tube 217 extends downwardly from the bottom of this compartment to the lower end of the hopper, and the lower edge of this tube lies in the same plane with the lower edges of the hopper against which the hopper door fits when said door is closed, so that when the hopper door is closed, it prevents leakage of material not only from the edges of the hopper but also past the lower edge of the tube 217, and the hopper door is provided with a discharge opening 218 of a size and shape which conform substantially to the interior bore of this tube. The tube 217 contains appropriate means for discharging material therefrom, such discharging means as shown in the present instance comprising an auger 219 which is connected to a driving shaft 220, the latter extending upwardly through the hopper and being connected to the reduction gearhead 221 of an electric motor 222. Rotation of the auger in the appropriate direction by the motor 222 discharges material from the compartment through the hopper door after it has closed, and into the filling spout 24 to form a portion of the weighment discharged into the bag on the spout.

The different operations in each cycle are controlled by switches which are controlled by the movements of the weigh beam 86. Some of these switches are operated by a link 225 connected to said beam and to a carrier 226 which is pivotally mounted at 226ª on a stationary plate 229 secured in the casing and having a pair of mercury switches 227 and 228 mounted thereon in relatively reversed positions so that when the carrier is rocked in one direction about the pivot by rising of the counterweighted end of the weigh beam, the switch 227 will be closed and the switch 228 will be open, and when the counterweighted end of the weigh beam descends, the switch 227 will be open, and the switch 228 closed.

An additional beam switch 230 is mounted on a stationary part of the casing and is connected by a link 231 to the weigh beam so that this switch will be closed while the counterweight end of the weigh beam is down and opened when said end of said beam rises.

Means is provided for indicating the accuracy of the weighings, such accuracy indicator comprising, in the present instance, an indicator 232 attached to the lower end of the rod 90 which suspends the counterweights for the weigh beam so that this indicator will rise and descend with the up and down movements of the counterweighted end of the beam, and this indicator passes over a suitable indicator plate marked with suitable indicia, such as "H" and "L" indicating respectively high and low weighings, and an intermediate line indicating balance of the beam. This indicator and plate are preferably housed in a suitable casing 233 which may be supported from the filling spout in a fixed position, and has a window therein through which the indicia on the indicator plate are visible.

The electric motors employed, except for the poise motor, may be of any suitable type, those shown in the present instance being of the polyphase type adapted to operate from a three-phase power system comprising the power lines $L^1$, $L^2$ and $L^3$. The feed motor 70 is controlled by a switch 240 the terminals of which are connected to the power lines and to the terminals of this motor and are adapted to be bridged by contactors 241, 242 and 243 carried by a bar 244, the contactors being normally held in disengaged relation with their respective pairs of contacts, as by a tension spring 245, and being engaged with their contacts by a solenoid 246 when energized, and the bar 244 of this switch carries a supplemental contactor 247 which is normally held in engagement with a pair of contacts 248 and 249 by the spring 245, and is disengaged from said contacts when the solenoid 246 is energized, for a purpose hereinafter described. The discharge motor 222 is controlled by a switch 250 the contacts of which are connected to the power lines $L^1$, $L^2$ and $L^3$ and to the terminals of this motor and are adapted to be bridged by contactors 251, 252 and 253 carried by a bar 254, these contactors being normally held in disengaged relation with their respective pairs of contacts, as by a tension spring 255, and being engaged with said contacts by a solenoid 256 when energized, and the bar 254 of this switch carries a supplemental contactor 250A which is normally held in engagement with its pair of contacts by the spring 255. The control circuits are preferably supplied with current at reduced voltage, as by a transformer 257 having its primary connected to two of the power lines and having its secondary connected to a main control switch 258 which, when closed, supplies current from the transformer to the main terminals 259 and 260 of the control circuits.

The control circuits, as shown in the diagram, Fig. 21, are connected as follows: A conductor 261 leads from the main terminal 259 to one terminal of a test switch 262, the other terminal of this switch being connected by a conductor 263 to one terminal of hopper door switch member 150a, the other terminal of this switch member being connected by a conductor 264 to one terminal of beam switch 230 the other terminal of which is connected by a conductor 265 to one terminal of normally closed contactor 250A of starter switch 250, the other terminal of said contactor being connected to one terminal of the solenoid 246, the other terminal of this solenoid being connected by a conductor 266 to the other main terminal 260. Another conductor 267 leads from the conductor 261 to a terminal of the hopper door switch member 150b, and a conductor 268 leads from the other terminal of this switch member to one terminal of the trigger releasing solenoid 176, the other terminal of this solenoid being connected by a conductor 269 to a conductor 270 leading to the main terminal 260, and the conductor 269 is also connected to a conductor 271 to which one terminal of the forward winding F and of the reverse winding R of the travelling poise motor 211 are connected. The poise motor shown is a split phase motor with capacitor C. The other terminal of the forward winding F is connected by a conductor 272 to the contact 248 of the switch 240, the other contact 249 of this switch being connected by conductors 273 and 280 to one terminal of beam switch 228, the other terminal of which is connected by conductor 281 to the remaining terminal of the reverse winding R of the travelling poise motor 211. A conductor 274 branches from the conductor 273 to one terminal of the interlock switch 200, the other terminal of which is connected by a conductor 275 to the conductor 264 leading from the hopper door switch member 150a. A conductor 276 branches from the conductor 261 to one terminal of the beam switch 227, the other terminal of this switch being connected by a conductor 277 to one terminal of the interlock switch 198 the other terminal of which is connected by a conductor 278 to one terminal of the solenoid 256 of the discharge motor control switch 250, the other terminal of this solenoid being connected to the conductor 270 and the main terminal 260.

The operations of the different elements of the machine having been hereinbefore described in detail, the general operation is as follows: Assuming that the predetermined weighed quantity of material to be introduced into each bag is 100 lbs., the tare weight 155 is suitable to counterbalance the weigh hopper and the mechanisms carried thereby, and a reservoir of material in addition to said predetermined quantity, and the weigh weight 157 is suitable to counterbalance said predetermined quantity. Also, assuming main switch 258 and test switch 262 are closed, feed belt 65 will be operated by the feed motor 70 in a direction of feed material therefrom into the weigh hopper 80, such material entering the compartment 215 as well as the rest of the hopper. During the feeding operation, the counterweighted end of the weigh beam will be down, and the control circuit for the feed motor 70 will be from the terminal 259, through conductor 261, closed test switch 262, closed hopper door switch member 150a, conductor 264, closed beam switch 230, conductor 265, contact 250A, solenoid 246 of feed motor starter switch 240 and conductor 266 to terminal 260, energizing of the solenoid 246 operating the bar 244 and the contactors thereon to engage their respective pairs of contacts and thereby connect the power lines L¹, L² and L³ to the terminals of the feed motor 70.

During the feeding of material into the weigh hopper, the travelling poise 202 is returned to its zero position through a circuit leading from the terminal 259, by conductors 261 and 263 closed hopper door switch member 150a, conductor 275 to interlock switch 200 which is then closed, conductor 274, beam switch 228 which is then closed, conductor 281, reverse winding R of poise motor 211 and conductors 271 and 270 to terminal 260. The poise motor operates until the poise reaches zero, whereupon this motor stalls but does not overheat since it is protected by a capacitor or condenser C which bridges its windings.

When the feed belt has fed sufficient material into the weigh hopper, the counterweighted end of the weigh beam 86 rises, thereby opening the beam switch 230 and de-energizing the solenoid 246, and permitting the spring 245 to open the feed motor starter switch 240. However, at the moment of cut-off of the feed, an excess amount of material is in the act of falling from the feed belt, and this excess material falls into the weigh hopper and makes a heavy weighing, or a weighing in excess of balance. The weigh beam consequently swings through balance and stays up, indicating a heavy weighing. This movement of the weigh beam opens the beam switch 228, thus breaking the circuit through the reverse winding R of poise motor 211 and this winding of this motor is no longer energized. By this time, as previously stated, the beam switch 230 has been opened by the weigh beam when at balance, thereby breaking the circuit through the solenoid 246 of the feed motor starter switch 240, allowing the spring 245 to return the contactor 247 to bridging relation with the contacts 248 and 249, thereby completing a circuit for the forward winding F of the poise motor 211 to advance the poise 202 to balance the excess weight of material which has entered the weigh hopper since balance condition, said circuit leading from terminal 259 through conductors 261, closed test switch 262, conductor 263, closed hopper door switch member 150a, conductor 275, interlock switch 200 which is then closed, conductors 274 and 273, contact 249, contactor 247, contact 248, conductor 272, forwarding winding F of poise motor 211, and conductor 270 to terminal 260. The poise motor operates to advance the poise 202, while the weigh weight 157 is lowered and acting on the weigh beam and the hopper door is closed, until the weigh beam is brought to full balance by the advance of the travelling poise, whereupon the beam switch 228 is closed, thereby energizing the reverse winding R of the poise motor 211 while its forward winding is also energized and thus producing a dynamic braking action on the poise motor which stops it, through a circuit which leads by conductors 274 and 280, through the then closed beam switch 228 and by conductor 281 to reverse winding R and from the latter by conductors 271 and 270 to terminal 260.

With the scale now in full balance, which will be indicated by the accuracy indicator 232 and assuming that a bag has been placed on the filling spout 24 while the bag holder is held open and the packer retracted by compressed air supplied to the cylinders 38 and 51 by the pipes 43 and 58 while the pedal 60 is held depressed by the operator, the scale is mechanically discharged by releasing said pedal, thereby permitting rotation of the valve member 59 to connect the compressed air inlet 55 to the pipes 42 and 56, thus causing compressed air to be admitted to the ends of the cylinders 38 and 51 to close the bag holder on the bag mouth surrounding the filling spout, and the packer to advance to a position beneath the bottom of the bag suspended from the filling spout.

Closing of the bag holder causes the roller 131 carried by the toggle 37 of the bag holder to swing upwardly from the full line to the dotted line position shown in Fig. 7, and to rock the lever 132 and arm 135 to the dotted line position shown in that figure, thus pulling the cable 137 downwardly and tilting the lever 141 and, through the toggle 145, causing the lever 115 to unlock the hopper door toggles, thus permitting the hopper door 100 to swing open under the weight of the material in the hopper. All of the weighed material in the hopper is thereby discharged therefrom through the filling spout and into the bag, with the exception of the quantity of material which was previously fed into and remained in the compartment 215. While the packer is advanced and the material is being introduced into the bag, the latter is oscillated about its vertical axis to settle and pack the material in the manner described in my aforesaid patent.

If, for example, the predetermined weight of material to be placed in each bag is 100 lbs., and the weigh weight 157 is selected or adjusted to counterbalance 97 lbs., approximately this latter amount will be dumped into the bag by the opening of the hopper door, immediately following which the hopper door will be closed by the counterweight 127 and will be locked in closed position by its toggles.

Tilting of the lever 146 by the pull of the cable 137 operates the switch arm 149 of the hopper door switch 150 to open the switch member 150a and simultaneously close the switch member 150b connected thereto. Closing of the latter switch member completes a circuit through the solenoid 176 which trips the trigger 172, this circuit leading from terminal 259, conductor 261, closed switch member 150b, conductor 268, through solenoid 176 and through conductors 269 and 270 to terminal 260. Tripping of the trigger 172 permits the spring 168 to lift the weigh weight 157 from the collar 156 and to thereby remove its influence upon the weigh beam, and as the weigh weight is lifted by the lever 160, the lug 196 which tilts with the latter, allows the switch arm 197 to descend and the interlock switch 198 to close, and it engages the switch arm 199 of interlock switch 200 and causes this switch to open. Opening of the interlock switch 200 opens the operating circuit for the poise motor 211 through the beam switch 230 which opens when the counterweight end of the weigh beam rises in consequence of the lifting of the weigh weight from the weigh beam, since the compartment 215 in the weigh hopper still contains a sufficient weight of material to overbalance the travelling poise 202.

Closing of the interlock switch 198 and the beam switch 227 initiates operation of the discharge motor 222 and the auger 219 driven by it, causing material to be discharged from the compartment 215 through the opening 218 in the hopper door and into the bag on the filling spout, the controlling circuit for the discharge motor being from the terminal 259 through conductor 261, conductor 276, beam switch 227 which is then closed, conductor 277, interlock switch 198 which is then closed, conductor 278, solenoid 256 of discharge motor starter switch 250 and then to terminal 260. Energizing of solenoid 256 operates the switch bar 254 to engage the contractors 251, 252 and 253 thereon with the pairs of contacts connected to the lines L¹, L² and L³ and to the terminals of discharge motor 222, causing this motor to operate the auger to discharge material from the compartment 215 until the weigh beam comes to balance, thereby opening the beam switch 227 and stopping the discharge motor.

If, for example, approximately 95 lbs. of material was dumped by the opening of the hopper door, approximately 5 lbs. of material to make up the predetermined desired 100 lbs. must be taken from compartment 215 to make up a 100 lbs. in the bag, and this 5 lbs. plus the excess residual amount was balanced by the advance of the travelling poise, consequently, the discharge motor will operate the auger to discharge the material until the weigh beam comes to balance, at which time the desired weighment of 100 lbs. will have been discharged, the residual material in the hopper remaining therein to make up part of the next weighment. Accumulation of excess material in the weigh hopper is thus offset. The compartment 215 is always filled to overflowing during the feeding so that immediately after the discharge, by opening the hopper door 100, there is always a full compartment 215 which contains approximately 15 lbs. or at least more than would ever be required to be added to the initial discharge from hopper door 100 to make up 100 lbs.

During normal operation, the test switch 262 is closed, and upon completion of each discharge, the beam swings through balance and closes beam switch 230, thereby closing the circuit through the solenoid 246 of feed motor starting switch 240 and thereby commencing another cycle of the operations hereinbefore described, the cycles being performed and repeated automatically.

However, if it is desired to occasionally test the machine for empty balance, the test switch 262 may be opened manually, and a balance may be noted after stopping of the discharge auger. Although beam switch 230 may close during such a test, the feed motor cannot start, due to the open test switch.

While the feed motor 70 is operating the feed belt to feed material into the weigh unit, the discharge motor 222 cannot operate since the interlock switch 198 in the control circuit of the discharge motor is then open; and while the discharge motor is operating to discharge material from the weigh unit, the feed motor cannot operate since contact 250A is open.

It will be apparent from the foregoing that approximately the desired weight of material may be fed to the weigh hopper or other weigh unit without compensating for the weight of the column of material falling from the feeding means at the moment of cut-off, which is controlled by the weigh weight while exerting its counterbalancing influence on the weigh unit, that excess of material acting on the weigh unit, representing the material falling from the feeding means at cut-off, is balanced by the travelling poise which brings the beam or scale system to balance, after which approximately the desired weight of material is discharged from the weigh unit, whereupon the discharging means operates to discharge material from the weigh unit until the beam or scale system again comes to balance under the influence of the travelling poise, the weight of material thus discharged under control of the auger and its motor, added to the amount previously discharged making up the total of the predetermined desired weight of material discharged during each weighing operation.

The improved weighing apparatus is thus adapted to weigh accurately materials of such a nature that it is difficult or impossible to compensate for the column thereof falling from the feeding means at the moment of cut-off, and also to provide accurate weighings of materials which tend to cling to the weigh unit since, according to the present invention, the predetermined desired weight of material is weighed out from the weigh unit regardless of the amount of material which may remain after the predetermined weight of material has been weighed out. It will be obvious, however, that the invention is also applicable to the weighing of liquids.

I claim:

Weighing apparatus comprising a weigh unit, a weighing system supporting the weigh unit and embodying weighing means to act thereon for balancing a predetermined weight of material acting on the weigh unit and means to act on the weighing system for balancing a weight of material acting on the weigh unit in excess of said predetermined weight, means controlled by the weighing system while the weigh means is acting thereon for feeding approximately said predetermined weight of material to the weigh unit, means controlled by the operator for discharging approximately said predetermined weight of material from the weigh unit while the weighing system is balanced by said weighing means and excess weight balancing means, means controlled by the weighing system for removing therefrom the influence of said weighing means while said system remains under the influence of said excess weight balancing means, and means controlled by the weighing system while under the influence of said excess weight balancing means for discharging material from the weigh unit until the weighing system balances.

PHILIP B. RICHARDSON.

REFERENCES CITED

The following references are of record in the file of this patent:

UNITED STATES PATENTS

| Number | Name | Date |
|---|---|---|
| 585,986 | Richards | July 6, 1897 |
| 607,462 | Richards | July 19, 1898 |
| 607,465 | Richards | July 19, 1898 |
| 638,673 | Richards | Dec. 5, 1899 |
| 810,694 | Arnett | Jan. 23, 1906 |
| 1,978,558 | Van Der Horst | Oct. 30, 1934 |
| 2,011,608 | Belknap | Aug. 20, 1935 |
| 2,067,743 | Weckerly | Jan. 12, 1937 |
| 2,332,438 | Clifford | Oct. 19, 1943 |
| 2,336,347 | Clifford | Dec. 7, 1943 |
| 2,348,372 | Weckerly | May 9, 1944 |
| 2,357,766 | Richardson | Sept. 5, 1944 |
| 2,373,831 | Howard | Apr. 17, 1945 |
| 2,434,177 | Richardson | Jan. 6, 1948 |